United States Patent
Nakata et al.

[15] 3,670,222
[45] June 13, 1972

[54] HIGH VOLTAGE CERAMIC CAPACITOR ASSEMBLY

[72] Inventors: Roy Nakata, Bryn Mawr; John A. Oppel, Aldan, both of Pa.

[73] Assignee: General Electric Company

[22] Filed: June 28, 1971

[21] Appl. No.: 157,265

[52] U.S. Cl. .............................. 317/261, 317/242
[51] Int. Cl. ............................................ H01g 1/13
[58] Field of Search .......................... 317/261, 242

[56] References Cited

UNITED STATES PATENTS 3,586,934  6/1971  Nakata .............................. 317/261

Primary Examiner—E. A. Goldberg
Attorney—J. Wesley Haubner et al.

[57] ABSTRACT

A ceramic capacitor assembly for high voltages comprising a plurality of ceramic capacitor blocks disposed in stacked relation within a tubular insulating housing. A spacer ring of insulating material is associated with each block for maintaining the peripheries of the blocks radially spaced from the insulating housing by a predetermined minimum amount sufficient to effectively prevent ionization in the gaps between the peripheries of the blocks and the tubular housing. Each spacer ring is anchored to its associated ceramic block in such a manner that all portions of the spacer ring that are disposed radially outward of the periphery of the ceramic block are located in a position axially spaced from each ceramic block.

8 Claims, 3 Drawing Figures

PATENTED JUN 13 1972

3,670,222

INVENTORS:
ROY NAKATA,
JOHN A. OPPEL.

BY William Friedman
ATTORNEY

HIGH VOLTAGE CERAMIC CAPACITOR ASSEMBLY

This invention relates to a high voltage ceramic capacitor assembly of the type shown and claimed in application Ser. No. 817,848—Nakata, filed Apr. 21, 1969, now U.S. Pat. No. 3,586,934, and assigned to the assignee of the present invention.

In that application, there is shown and claimed a capacitor assembly that comprises a plurality of ceramic capacitor units stacked in axially aligned relationship and electrically connected in series. Each capacitor unit comprises a ceramic block having spaced-apart planar faces covered with a conductive coating and a pair of end rings of electrical insulating material bonded to said conductive coatings. The periphery of the bonded capacitor unit is subjected to a grinding operation that removes sufficient material to achieve precise alignment between the outer peripheries of the ceramic block, the conductive coatings, and the end rings. It is customary to include as part of such an assembly a tubular housing of insulating materials surrounding the stacked capacitor units.

When such a housing is present around the capacitor units, there exists the possibility that there will be small critical gas gaps between the capacitor units and the tubular insulating housing. When a high voltage is applied to the capacitor stack, these gas gaps can ionize and trigger a breakdown across the capacitor units.

To prevent such critical gas gaps from being present, spacing means is needed in order to maintain the capacitor units radially spaced form the tubular insulating housing by a distance greater than the critical gap length.

An object of our invention is to construct and arrange the spacing means in such a manner that it can be of an inexpensive material and can be easily and inexpensively incorporated into the capacitor assembly.

Another object is to construct and arrange the spacing means in such a manner that its presence causes no critical gas gaps to be introduced between the spacing means and the ceramic capacitor unit.

Still another object is to construct the capacitor assembly in such a manner that if the bond that is present between the capacitor unit and the spacing device fails, the spacing device still remains in place to perform its desired spacing function.

In carrying out the invention in one form, we provide each capacitor unit with spacing means for maintaining the periphery of the ceramic capacitor block radially spaced from the tubular insulating housing by a predetermined minimum amount sufficient to effectively prevent ionization in the region of the ceramic periphery. This spacing means comprises two spacer rings of electrical insulating material, each anchored to one of the insulating end rings of the ceramic capacitor unit. These spacer rings extend radially outward beyond the outer periphery of the ceramic block, and all portions of the spacing rings which are disposed radially outward of the periphery of the ceramic block are located in a position axially spaced from each of said ceramic blocks.

For a better understanding of the invention, reference may be had to the following description taken in conjunction with the accompanying drawings, wherein.

Figure 1:
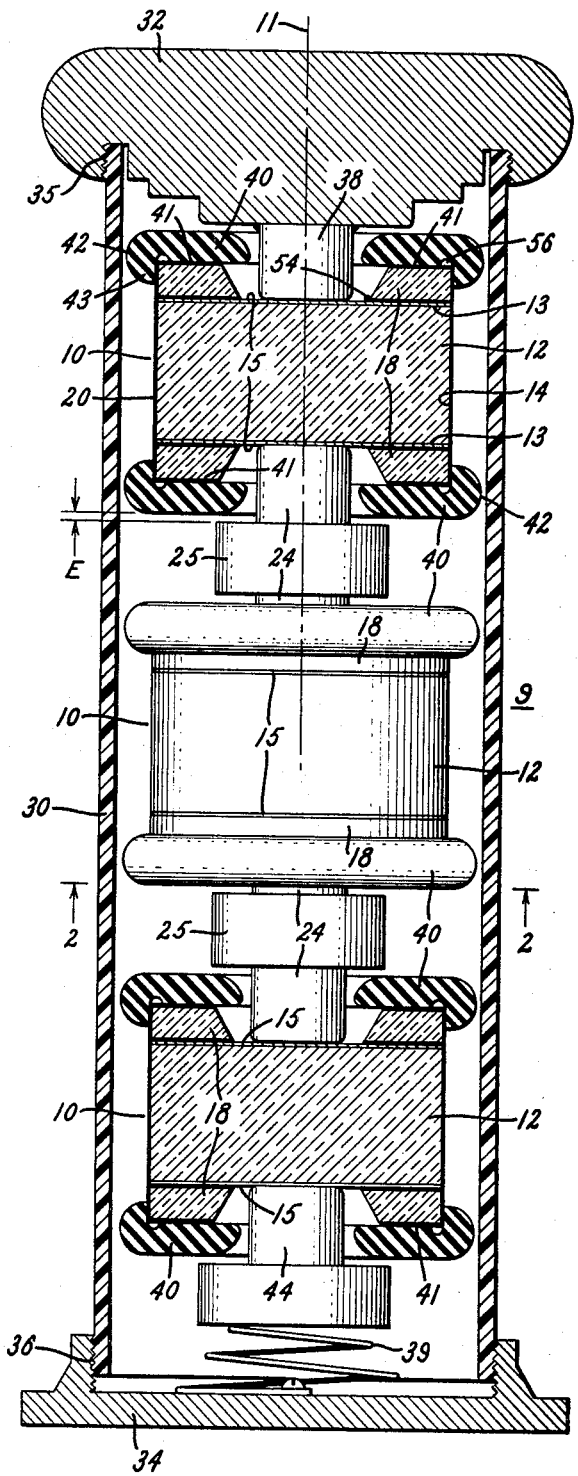
FIG. 1 is a sectional view of a capacitor assembly embodying one form of our invention.
Figure 2:
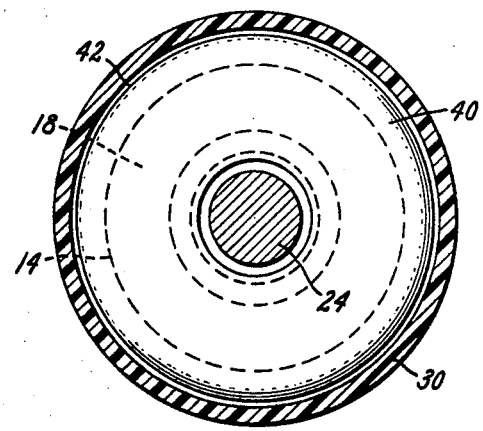
FIG. 2 is a sectional view along the line 2—2 of FIG. 1.

Referring now to FIG. 1, the capacitor assembly is designated 9 and comprises a plurality of ceramic capacitor units 10 stacked in end-to-end relationship along the central longitudinal axis 11 of the capacitor assembly.

Each capacitor unit 10 comprises a cylindrical ceramic disc or block 12 having a pair of opposed planar faces 13 extending transversely of the longitudinal axis 11 and a cylindrical periphery 14 extending between the planar faces generally parallel to the longitudinal axis 11. Each planar face 13 is covered by an end coating 15 of conductive material bonded thereto. Preferably, this coating is a silver dispersion fused integrally onto the ceramic face 14. Each of the ceramic disks is made of a ceramic material having a high dielectric strength and a high dielectric constant, such as, for example, barium titanate. A typical dielectric constant is in the range of several hundred to several thousand relative to that of air.

Also forming a part of each capacitor unit are two end rings 18 made of an electrical insulating material such as steatite porcelain that has substantially the same coefficient of thermal expansion as the ceramic material of the gap. Each of these end rings has a planar face on one surface located adjacent the conductive coating 15. A suitable cement is relied upon to adherently bond this face of the end ring 18 to the adjacent conductive coating 15.

Each of these capacitor units 10 is preferably made by the method disclosed and claimed in the aforesaid application Ser. No. 817,848. In this respect, after the end rings 18 have been bonded to the ceramic capacitor element 12, the resulting bonded unit is placed in a centerless grinding machine; and the periphery of the bonded unit is ground until precise alignment is attained between the outer periphery of the ceramic element 12, the outer periphery of the end rings 18, and the outer periphery of the conductive coatings 15. Of particular importance is the fact that after such grinding the peripheral edge of each conductive coating 15 is located precisely flush with the final peripheral surface 14 of the adjacent ceramic capacitor element and is in virtually perfect alignment with said peripheral surface.

The metal coating 15 is relatively fragile, and grinding does have a tendency to produce tiny peripheral chips in this coating; but such chips are avoided because the coating is sandwiched between two relatively strong parts 12 and 18 in intimate engagement with the coating about the entire area being ground. The presence of the end rings 18 also serves to prevent chips from developing in the periphery of the ceramic capacitor element 12 adjacent the conductive coating during the grinding operation.

After each unit 10 has been ground to provide a smooth periphery along its entire length, the periphery of the unit is coated with a thin layer or film of dielectric material 20, typically having a thickness of about 2 mils. A suitable material for this coating 20 is a silicone or polyester varnish. The purpose of the thin dielectric coating is to suppress field emission and micro-discharge initiated breakdowns from the edge of the metal coatings 15. Coverage of the insulating end rings 18 by this thin coating 20 is not important except insofar as it facilitates coverage of the outer peripheral edge of the juxtaposed end electrodes 15. The relative dielectric constant of the coating is typically about 3 to 5.

For electrically connecting the ceramic capacitor units in series, a plurality of conductive buttons 24 are provided. One of these conductive buttons 24 is located between each pair of ceramic capacitor units 10. Each of these conductive buttons is preferably of generally cylindrical form and has a pair of opposed planar faces which contact the metal coatings 15 of the ceramic units 10 to provide a good electrical connection between the button and the conductive coatings. Each button 24 has an enlarged central portion 25 thereon, the purpose of which will soon be explained.

For maintaining the capacitor units 10 and the buttons 24 in stacked, axially aligned relationship, a tubular housing 30 of insulating material is provided about these elements. At opposed ends of the tubular insulating housing 30, metallic terminal structures 32 and 34 for the capacitor assembly are provided. These terminal structures 32 and 34 are respectively connected to the tubular insulating housing 30 by suitable means such as threaded joints 35 and 36. These terminal structures are connected in a high voltage power circuit by suitable means, (not shown). At the top of the capacitor assembly, a conductive button 38, preferably, but not necessarily, brazed to the top terminal structure 32, bears against the conductive coating 15 on the top of the top ceramic element 12. At the bottom of the capacitor assembly, a conductive button 44 bears against the conductive coating 15 on the bottom of the bottom ceramic element 12. A flexible conductive connection in the form of a compression spring 39 is provided between the lower terminal structure 34 and the button 44 to carry current between these parts. This spring bears at one end on terminal structure 34 and at its other end on button 44. Contact between the buttons and their adjacent ceramic capacitor units 10 is maintained by the compression spring 39. Compression spring 39 provides an upward force which urges each internal element of the assembly upward into firm engagement with its adjacent element. It will therefore be apparent that the capacitor elements are electrically connected in series circuit relationship between the terminal structures 32 and 34.

When a tubular housing such as 30 is present around the capacitor units, there exists the possibility that there will be small critical gas gaps between the capacitor units and the tubular housing. When a high voltage is applied to the capacitor assembly, these gas gaps can ionize and trigger a breakdown across the capacitor assembly. To prevent such critical gas gaps from being present, we provide spacing means that serves to maintain the capacitor units radially spaced from the tubular housing 30 by a distance greater than the critical gap length.

This spacing means comprises, for each capacitor unit 10, a pair of spacer rings 40 of electrical insulating material disposed at axially opposed ends of the unit. Each of these spacer rings 40 is bonded by a suitable adhesive at 41 to the outer face of an end ring 18. Each spacer ring 40 projects radially outward beyond the outer periphery of the adjacent end ring 18 and has an outer periphery 42 fitting loosely within tubular housing 30. If a capacitor unit 10 shifts laterally by a small amount, this outer periphery 42 of its spacer ring will contact the inner periphery of tubular housing 30 to limit further lateral shifting. The diameter of each spacer ring is sufficiently large to limit the minimum spacing between the tubular housing 30 and the outer periphery 14 of the ceramic capacitor element 12 to a distance greater than the critical gap length.

Each spacer ring 40 comprises a radially extending body portion and an axially extending flange 43 which surrounds the adjacent end ring 18. One function of this flange 43 is to locate and center the spacer ring 40 with respect to the capacitor unit. Another function is to prevent any substantial radial shifting of the capacitor unit 10 with respect to the spacer ring 40 should there be a failure of the bond between spacer ring 40 and end ring 18. In this latter regard, it is to be noted that each of the conductive buttons 24 has an enlargement or shoulder 25 thereon which will prevent axial movement of the spacer ring 40 by more than a distance E should the bond at 41 fail. This distance E is shorter than the length of flange 43. Thus, even if the spacer ring moved axially through distance E, the flange 43 would still be surrounding end ring 18 and in a position to prevent substantial shifting of the capacitor unit 10 with respect to the spacer ring 40.

The bond between each of the end rings 18 and its adjacent conductive coating 15 must be a high quality bond in order to enable the end ring to function as above described to protect the conductive coating during the above-described grinding operation. For this reason, care is taken to completely cover the interface between 18 and 15 with adhesive and to cure the adhesive by means of a baking operation. Far less care need be taken with the bond at 41 between spacer ring 40 and the end ring 18. Even if this latter bond should fail, spacer ring 40 can still perform its intended function, as described hereinabove. Accordingly, the spacer rings are preferably applied after the capacitor unit is otherwise complete and without reliance upon baking to cure the adhesive at 41. The spacer rings 40 should be of an electrical insulating material, but may be of a very inexpensive material since their function is primarily a mechanical one and the bond at 41 is not a crucial one. Since the bond at 41 is not crucial and requires no baking, it is not necessary to utilize for ring 40 a material whose coefficient of thermal expansion closely matches that of adjacent ring 18.

Figure 3:
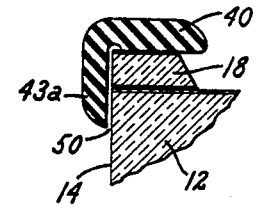
FIG. 3 is a detailed sectional view illustrating a construction which should be avoided.

It is most important that the flange 43 on each of the spacer rings 40 terminate along a line that is axially spaced from its ceramic block 12. No portion of the spacer ring 40, including flange 43, should extend into axially overlapping relation with the periphery 14 of the ceramic block 12. FIG. 3 has been included to show this overlapping condition that should be avoided. In this figure, flange 43a extends into overlapping relation with periphery 14 of the ceramic element 12. The reason that it is important to avoid such overlapping is that it can result in the presence of a small gas gap, such as shown at 50, between the flange 43a and the ceramic periphery 14. Such a gap is susceptible to ionization, and this could trigger a harmful breakdown. If a similar gap should be present between any of our flanges 43 and the outer periphery of end ring 18, there would be little or no tendency to ionize the gap because it is located behind electrodes 15 in a region of very low electric field.

Another significant feature of our spacer ring 40 is that it extends radially inwardly substantially beyond the inner periphery of its associated end ring 18. This relationship maintains button 24 radially spaced from the inner periphery of the end ring. This is of importance because occasionally some adhesive is extruded out from the interface between end ring 18 and conductive coating 15 during the baking operation, forming a small bead (such as shown at 54) at the inner periphery of the end ring. If the button 24 is allowed to closely approach the inner periphery of the end ring, there is a chance that it will ride on to this bead of adhesive, and this would interfere with proper contact being made between the button and the conductive coating 15.

To facilitate bonding of the spacer rings 40 to their associated end rings 18, a groove 56 is provided in each spacer ring at the inner periphery of flange 43 where this inner periphery of flange 43 and the body portion of the ring intersect. This groove assures that material of the spacer ring which would otherwise be present in this region does not interfere with proper seating of the spacer ring on the end ring surface.

While we have shown and described a particular embodiment of our invention, it will be obvious to those skilled in the art that various changes and modifications may be made without departing from our invention in its broader aspects; and we, therefore, intend herein to cover all such changes and modifications as fall within the true spirit and scope of our invention.

What we claim as new and desire to secure by Letters Patent of the United States is:

1. In a high voltage ceramic capacitor assembly:
   a. a plurality of ceramic capacitor blocks, each having an outer peripheral surface, a pair of opposed substantially planar surfaces extending transversely of said peripheral surface, and a conductive coating adherently bonded to each of said planar faces,
   b. a pair of end rings of electrical insulating material for each of said ceramic blocks, each end ring having a surface bonded to one of said conductive coatings and abutting said coating about substantially the entire outer peripheral region of said coating,
   c. each of said conductive coatings having a peripheral edge extending about the entire periphery of said ceramic block in precisely aligned relationship with the peripheral surface of the ceramic capacitor material and the end ring material thereadjacent,
   d. a thin coating of insulating material covering the peripheral edge of each of said conductive coatings and the immediately adjacent peripheral surface of the ceramic block adjacent said conductive coating,
   e. each of said end rings being of a material that has substantially the same coefficient of thermal expansion as the ceramic of its associated capacitor block,
   f. at least one conductive button,
   g. a tubular housing of electrical insulating material,
   h. said capacitor blocks being disposed in stacked relationship within said tubular housing, with a conductive button located between each adjacent pair of said capacitor blocks and contacting the conductive coatings thereon for connecting said blocks electrically in series, i. spacing means for maintaining the peripheries of said ceramic capacitor blocks radially spaced from said insulating housing by a predetermined minimum amount sufficient to effectively prevent ionization in the gaps between said peripheries and the tubular housing, j. said spacing means comprising, for each ceramic block, a spacer ring of electrical insulating material anchored to one end ring of said ceramic block and extending radially outward beyond the outer periphery of said ceramic block, all portions of said spacer ring that are disposed radially outward of the periphery of said ceramic block being located in a position axially spaced from each of said ceramic blocks.

2. The capacitor assembly of claim 1 in which each of said spacer rings is adhesively bonded to the end ring thereadjacent.

3. The capacitor assembly of claim 1 in which: there is associated with each ceramic block a second spacer ring of electric insulating material anchored to the other end ring of said ceramic block and extending radially outward beyond the outer periphery of said ceramic block, all portions of said second spacer ring that are disposed radially outward of the periphery of said ceramic block being located in a position axially spaced from each of said ceramic blocks.

4. The capacitor assembly of claim 3 in which:
a. each of said conductive buttons is surrounded by an end ring and the spacer ring anchored to said end ring, and
b. each of said spacer rings extends radially inwardly beyond the inner periphery of its associated end rings, thereby maintaining the button that is surrounded by said spacer ring radially spaced from said end ring.

5. The capacitor assembly of claim 1 in which:
a. each of said spacer rings comprises a radially extending body portion and a flange at the outer periphery of said body portion extending toward its associated ceramic capacitor block axially of said tubular housing,
b. the distal end of said flange terminates along a line axially spaced from said associated ceramic block, said flange surrounding the end ring adjacent said spacer ring.

6. The ceramic capacitor assembly of claim 5 in which:
a. each of said spacer rings and the end ring anchored thereto have generally flat faces bonded to each other, with the flange on said spacer ring surrounding the associated end ring, and
b. each of said spacer rings includes a circumferential groove at the inner periphery of said flange in the region where said inner periphery and said body portion intersect, thereby eliminating any material in this region that could interfere with the proper seating of the generally flat faces of said end ring and said spacer ring.

7. The capacitor assembly of claim 1 in which:
a. each of said buttons is surrounded by an end ring and a spacer ring on one of said capacitor blocks,
b. said button has a shoulder thereon that is located at the outer side of its associated spacer ring in a location to hold said spacer ring in place on its associated end ring should the spacer ring move axially with respect to the end ring.

8. The capacitor assembly of claim 7 in which: each of said spacer rings includes a flange at its outer periphery that surrounds its associated end ring, said flange having a length that is greater than the distance between said spacer ring and the shoulder on the associated button, whereby the shoulder limits axial movement of said spacer ring to such an extent that said flange remains in a position around said end ring when the spacer ring engages said shoulder.

* * * * *